US012496865B1

(12) United States Patent
Kim et al.

(10) Patent No.: US 12,496,865 B1
(45) Date of Patent: Dec. 16, 2025

(54) LOAD DISTRIBUTION STRUCTURE FOR SHOCK ABSORBER OF VEHICLE

(71) Applicants: Hyundai Motor Company, Seoul (KR); Kia Corporation, Seoul (KR)

(72) Inventors: Jung-Ki Kim, Hwaseong-si (KR); Jun-Hyoung Kim, Hwaseong-si (KR); Min-Cheol Kim, Hwaseong-si (KR); Sun-Ki Choi, Hwaseong-si (KR); Soo-Kyung Han, Hwaseong-si (KR); Won-Gun Kim, Hwaseong-si (KR); Min-Uke Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/952,073

(22) Filed: Nov. 19, 2024

(30) Foreign Application Priority Data

Jun. 17, 2024 (KR) ........................ 10-2024-0078225

(51) Int. Cl.
*B60G 13/00* (2006.01)
(52) U.S. Cl.
CPC ........ *B60G 13/003* (2013.01); *B60G 2204/12* (2013.01); *B60G 2206/014* (2013.01); *B60G 2206/604* (2013.01)
(58) Field of Classification Search
CPC .................................................. B62D 25/088
See application file for complete search history.

(56) References Cited

U.S. PATENT DOCUMENTS

| 5,246,263 | A  | * | 9/1993 | Tanaka ................. | B62D 25/087 296/187.11 |
| 11,648,982 | B2 | * | 5/2023 | Lee ..................... | B62D 25/2036 280/788 |
| 2003/0089545 | A1 | * | 5/2003 | Seksaria .............. | B62D 25/088 180/312 |
| 2022/0289297 | A1 | * | 9/2022 | Watanabe .......... | B62D 25/2027 |
| 2023/0242182 | A1 | * | 8/2023 | Chino ................ | B62D 25/2027 296/193.08 |

FOREIGN PATENT DOCUMENTS

| CN | 115158480 A | * | 10/2022 | ........... B62D 25/085 |
| DE | 102012113211 A1 | * | 2/2014 | ............. B62D 25/08 |
| DE | 102015223191 A1 | * | 2/2017 | ............. B60R 19/24 |

(Continued)

*Primary Examiner* — Nicole T Verley
(74) *Attorney, Agent, or Firm* — SLATER MATSIL, LLP (57) ABSTRACT

A load distribution structure for a shock absorber of a vehicle includes a shock absorber mounting panel fastened to an upper end of the shock absorber of the vehicle, a quarter upper member disposed in a longitudinal direction of the vehicle, a rear side member disposed in the longitudinal direction of the vehicle and configured to support a lower end of the shock absorber mounting panel, a shock absorber member mid having a lower end connected to the rear side member, and a shock absorber member upper having a lower end connected to the shock absorber member mid and an upper end connected to the quarter upper member, wherein a closed cross section is defined in the rear side member, the shock absorber member mid, and the shock absorber member upper, which are connected to each other.

19 Claims, 9 Drawing Sheets

(56) References Cited

FOREIGN PATENT DOCUMENTS

| | | | | |
|---|---|---|---|---|
| DE | 102016015016 A1 | * | 6/2017 | ............. B62D 21/02 |
| DE | 102017011779 A1 | * | 8/2018 | ............. B62D 21/15 |
| EP | 0825094 A1 | * | 2/1998 | |
| EP | 2865581 A2 | * | 4/2015 | ........... B60G 15/067 |
| JP | H0589164 U | * | 12/1993 | |
| JP | H09207818 A | * | 8/1997 | |
| JP | 2750261 B2 | * | 5/1998 | |
| JP | 2000168613 A | * | 6/2000 | |
| JP | 3525604 B2 | * | 5/2004 | |
| JP | 2007062590 A | * | 3/2007 | |
| JP | 2011168121 A | * | 9/2011 | |
| JP | 2012224165 A | * | 11/2012 | |
| JP | 2013095359 A | * | 5/2013 | |
| JP | 2014019269 A | * | 2/2014 | |
| JP | 5915622 B2 | * | 5/2016 | ............. B62D 21/00 |
| JP | 2016112991 A | * | 6/2016 | |
| KR | 20020015128 A | * | 2/2002 | |
| KR | 20050029505 A | | 3/2005 | |
| KR | 20080054905 A | * | 6/2008 | |
| KR | 101027922 B1 | * | 4/2011 | |
| KR | 1575262 B1 | * | 12/2015 | ............. B60R 19/24 |
| KR | 20250014260 A | * | 2/2025 | |
| WO | WO-2014097515 A1 | * | 6/2014 | ........... B62D 25/082 |
| WO | WO-2014183976 A1 | * | 11/2014 | ............. B62D 21/11 |
| WO | WO-2015190034 A1 | * | 12/2015 | ............. B62D 25/02 |

* cited by examiner

LOAD DISTRIBUTION STRUCTURE FOR SHOCK ABSORBER OF VEHICLE

CROSS-REFERENCE TO RELATED APPLICATIONS

This application claims the benefit of Korean Patent Application No. 10-2024-0078225, filed on Jun. 17, 2024, which application is hereby incorporated herein by reference in its entirety.

TECHNICAL FIELD

Exemplary embodiments of the present disclosure relate to a load distribution structure for a shock absorber of a vehicle.

BACKGROUND

Shock absorbers are installed in vehicles to reduce vibrations transmitted from a road surface to vehicle bodies.

The shock absorber absorbs a load input from the road surface and transmits the absorbed load to the vehicle body.

A vehicle such as a pickup truck has a structure in which a load input through a shock absorber, especially a rear shock absorber, is transmitted to a wheelhouse inner by connecting a bracket and a reinforcement using the wheelhouse inner flange.

However, due to the structure in which the rear shock absorber is connected only to the bracket and the reinforcement, the rear shock absorber is not connected to other components, which is disadvantageous for a load distribution.

As described above, there is a problem in that torsional rigidity is deteriorated as a cumulative travel distance of the vehicle increases due to insufficient connectivity of the rear shock absorber.

SUMMARY

Exemplary embodiments of the present disclosure relate to a load distribution structure for a shock absorber of a vehicle. Particular embodiments related to a load distribution structure for a shock absorber of a vehicle, which improves connectivity between a rear shock absorber and a quarter member of a vehicle, distributes a load input into the vehicle through the rear shock absorber, and transmits the load to a vehicle body.

An embodiment of the present disclosure provides a load distribution structure for a shock absorber of a vehicle, which improves connectivity of a rear floor and a quarter member in order to distribute a load input to a shock absorber of a vehicle and transmit the distributed load to a vehicle body.

Other objects and advantages of embodiments of the present disclosure can be understood by the following description and become apparent with reference to the embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided a load distribution structure for a shock absorber of a vehicle, which includes a shock absorber mounting panel fastened to an upper end of a shock absorber of a vehicle, a quarter upper member formed in a longitudinal direction of the vehicle, a rear side member formed in the longitudinal direction of the vehicle and configured to support a lower end of the shock absorber mounting panel, a shock absorber member mid whose lower end is connected to the rear side member, and a shock absorber member upper whose lower end is connected to the shock absorber member mid and whose upper end is connected to the quarter upper member, wherein a closed cross section is formed in the rear side member, the shock absorber member mid, and the shock absorber member upper, which are connected to each other.

The load distribution structure may further include a shock absorber mounting reinforcement configured to reinforce rigidity of the shock absorber mounting panel on an upper surface of the shock absorber mounting panel.

The shock absorber mounting reinforcement and the shock absorber may be disposed on upper and lower surfaces of the shock absorber mounting panel, respectively, and the shock absorber mounting reinforcement may be formed such that the shock absorber mounting panel and the shock absorber are integrally fastened.

The quarter upper member may include a quarter upper inner and a quarter upper outer disposed on an outer side of the vehicle relative to the quarter upper inner and whose upper and lower ends are fastened to upper and lower ends of the quarter upper inner, respectively.

The shock absorber member upper may include a shock absorber member upper inner formed in a height direction of the vehicle and fastened to a lower portion of the quarter upper member, and a shock absorber member upper outer disposed on an outer side of the vehicle relative to the shock absorber member upper inner, fastened to the shock absorber member upper inner, and fastened to a lower portion of the quarter upper member on the outer side of the vehicle below the quarter upper member relative to the shock absorber member upper inner.

A closed cross section may be formed to surround inner surfaces of the shock absorber member upper inner and the shock absorber member upper outer in a direction parallel to a ground.

The shock absorber member mid may include a shock absorber member mid inner formed in the height direction of the vehicle and fastened to a lower portion of the shock absorber member upper inner and a shock absorber member mid outer disposed on the outer side of the vehicle relative to the shock absorber member mid inner and fastened to a lower portion of the shock absorber member upper outer.

The shock absorber member upper inner, the shock absorber member upper outer, the shock absorber member mid inner, and the shock absorber member mid outer may be disposed with an interval from each other in a front-rear direction in the longitudinal direction of the vehicle.

An upper portion of the shock absorber member mid inner may be positioned on the inner side of the vehicle relative to a lower portion of the shock absorber member upper inner.

A closed cross section may be formed to connect inner surfaces of the shock absorber member upper inner, the shock absorber member upper outer, the shock absorber member mid inner, the shock absorber member mid outer, and the quarter upper member in the height direction of the vehicle.

The load distribution structure may further include a shock absorber member lower outer whose upper portion is fastened to the lower portion of the shock absorber member mid and whose lower portion is fastened to an outer portion of the rear side member.

A closed cross section may be formed to connect inner surfaces of the shock absorber member mid inner, the rear side member, the shock absorber member lower outer, and the shock absorber member mid outer.

A lower portion of the shock absorber member mid inner may be connected to a cross member provided in a lateral direction of the vehicle.

The cross member may include a cross member upper whose side end is fastened to the lower portion of the shock absorber member mid inner and a cross member lower disposed below the cross member upper and whose side end is fastened to a bottom surface of the rear side member.

DETAILED DESCRIPTION OF ILLUSTRATIVE EMBODIMENTS

Hereinafter, a load distribution structure for a shock absorber of a vehicle according to embodiments of the present disclosure will be described in detail with reference to the accompanying drawings.

The shock absorber of a vehicle according to embodiments of the present disclosure includes a shock absorber mounting panel 31 fastened to an upper end of a shock absorber 40 of a vehicle, a quarter upper member 10 formed in a longitudinal direction of the vehicle, a rear side member 33 formed in the longitudinal direction of the vehicle and configured to support a lower end of the shock absorber mounting panel 31, a shock absorber member mid 22 whose lower end is connected to the rear side member 33, and a shock absorber member upper 21 whose lower end is connected to the shock absorber member mid 22 and whose upper end is connected to the quarter upper member 10. A closed cross section is formed in the rear side member 33, the shock absorber member mid 22, and the shock absorber member upper 21, which are connected to each other.

The shock absorber 40 is installed in the vehicle to reduce vibrations transmitted from a road surface to a vehicle body.

According to embodiments of the present disclosure, by improving a structure of a portion where a rear shock absorber 40 installed at a rear wheel of a vehicle, such as a pickup truck, is installed on a vehicle body, a load input to the rear shock absorber 40 is distributed and transmitted upward.

In a pickup truck, a loading box is formed at a rear side of the vehicle into which cargo is loaded. A bottom surface of the loading box is finished with a rear floor panel (not shown), and the rear floor panel is supported by a rear side member 33 disposed in the longitudinal direction of the vehicle and a cross member 34 disposed in a width direction of the vehicle. Both side ends of the rear floor panel are provided with the quarter upper members 10 disposed in the longitudinal direction of the vehicle.

The load input through the shock absorber 40 is transmitted from the shock absorber 40 to the quarter upper members 10 and is distributed and transmitted by the shock absorber members provided therebetween.

The upper end of the shock absorber 40 is fastened to the shock absorber mounting panel 31. The shock absorber mounting panel 31 is formed to have a predetermined area, and the upper end of the shock absorber 40 is brought into contact with a bottom surface of the shock absorber mounting panel 31, and then the shock absorber 40 is fastened to the shock absorber mounting panel 31 using a fastening member such as a fastening bolt.

The shock absorber mounting panel 31 is formed to have a step difference in the width direction of the vehicle.

In addition, the shock absorber mounting panel 31 is connected to the shock absorber member mid 22 at front and rear sides of the vehicle.

A shock absorber mounting reinforcement 32 is provided to secure rigidity of the shock absorber mounting panel 31 on which the shock absorber 40 is mounted.

In a state in which a bottom surface of the shock absorber mounting reinforcement 32 is seated on an upper surface of the shock absorber mounting panel 31, the shock absorber mounting reinforcement 32 is fastened to the shock absorber mounting panel 31.

Figure 2:
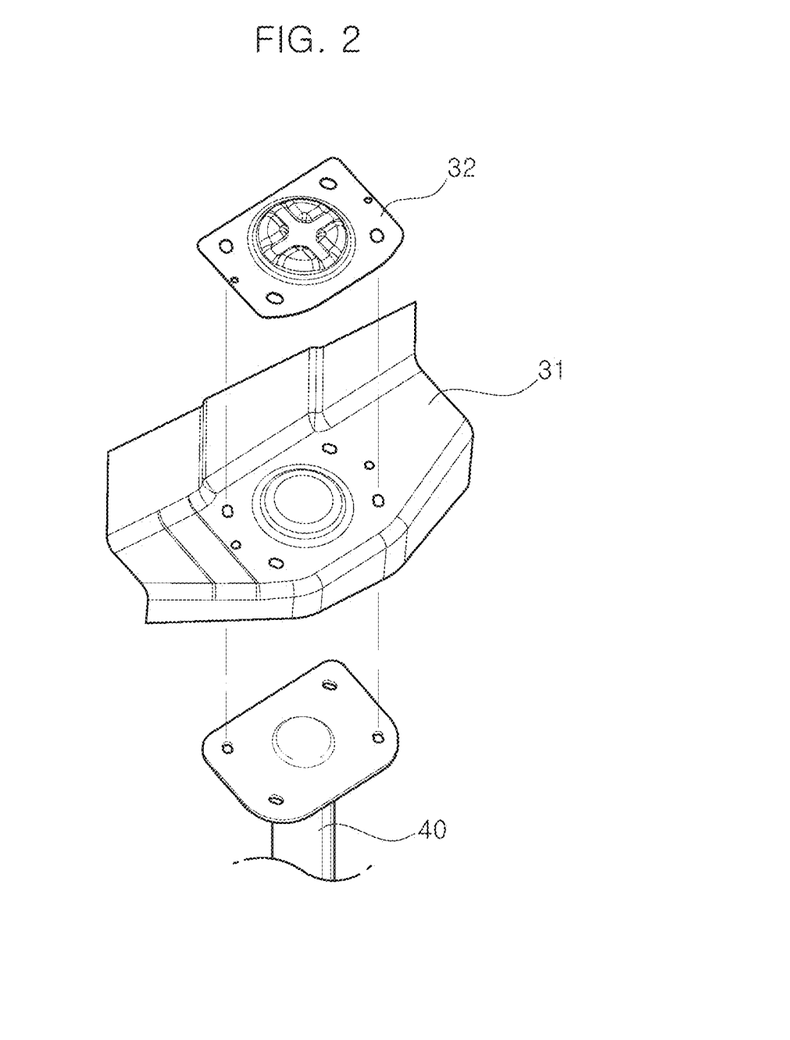
FIG. 2 is an exploded perspective view illustrating a coupling relationship of a shock absorber, a shock absorber mounting panel, and a shock absorber mounting reinforcement in the load distribution structure for a shock absorber of the vehicle according to embodiments of the present disclosure.

As shown in FIG. 2, the shock absorber mounting panel 31, the shock absorber 40, and the shock absorber mounting reinforcement 32 are disposed and fastened to each other. That is, the shock absorber mounting reinforcement 32 and the shock absorber 40 are disposed on the upper and lower surfaces of the shock absorber mounting panel 31, respectively, and the shock absorber mounting reinforcement 32, the shock absorber mounting panel 31, and the shock absorber 40 are integrally fastened so that rigidity of a portion where the shock absorber 40 is mounted can be increased.

The quarter upper member 10 is formed in the longitudinal direction of the vehicle.

The quarter upper member 10 includes a quarter upper inner 11 and a quarter upper outer 12 to have a hollow structure therein.

The quarter upper inner 11 and the quarter upper outer 12 are disposed on the inner and outer sides of the vehicle, and upper and lower ends are fastened by welding or the like. Thereby a structure of a closed cross section with a hollow inside is configured.

The rear side member 33 is formed in the longitudinal direction of the vehicle and supports the lower end of the shock absorber mounting panel 31.

In the rear side member 33, a rear side member inner 33a and a rear side member outer 33b are disposed on the inner and outer sides, respectively, in the width direction of the vehicle, and upper and lower ends of the rear side member inner 33a and the rear side member outer 33b are fastened to each other by welding or the like. Thus, the rear side member 33 forms a hollow structure with a closed cross section.

The shock absorber member upper 21, the shock absorber member mid 22, and a shock absorber member lower outer 23a, which will be described below, are provided and connected between the quarter upper member 10 and the rear side member 33 so that the load input to the shock absorber 40 is distributed and transmitted upward.

An upper end of the shock absorber member upper 21 is connected to the quarter upper member 10 and a lower end thereof is connected to the shock absorber member mid 22.

In the shock absorber member upper 21, a shock absorber member upper inner 21a and a shock absorber member upper outer 21b are disposed on the inner and outer sides of the vehicle and are connected to each other.

The shock absorber member upper inner 21a is formed in a height direction of the vehicle and is fastened to a lower portion of the quarter upper member 10.

The shock absorber member upper outer 21b is disposed on the outer side of the vehicle relative to the shock absorber member upper inner 21a and is fastened to the shock absorber member upper inner 21a. The shock absorber member upper outer 21b is fastened to the lower portion of the quarter upper member 10 on the outer side of the vehicle, relative to the shock absorber member upper inner 21a.

Figure 5:
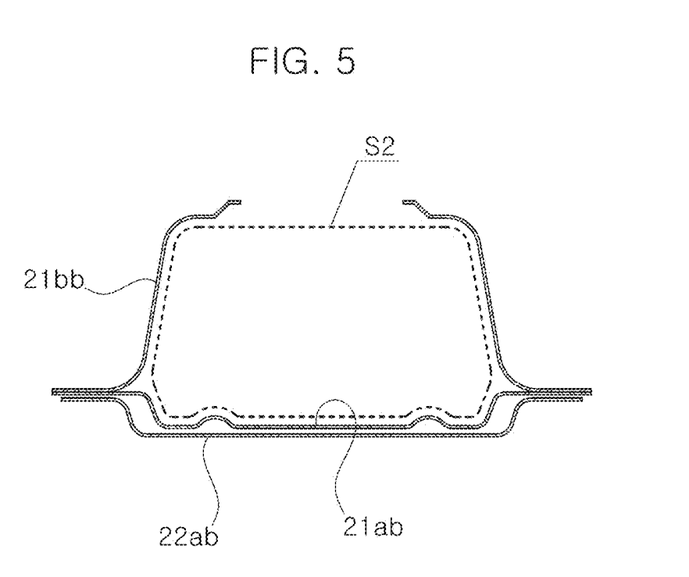
FIG. 5 is a cross-sectional view along line B-B of FIG. 3.

The shock absorber member upper inner 21a and the shock absorber member upper outer 21b are fastened to each other by welding or the like to form the shock absorber member upper 21 that is a single structure. That is, front and rear ends of the shock absorber member upper inner 21a and the shock absorber member upper outer 21b are fastened to each other in the longitudinal direction of the vehicle. Thus, a cross section of the shock absorber member upper 21 parallel to the ground has a shape as shown in FIG. 5. A closed cross section S2 is formed within the cross section so that the shock absorber member upper 21 has a rigid structure.

Figure 1:
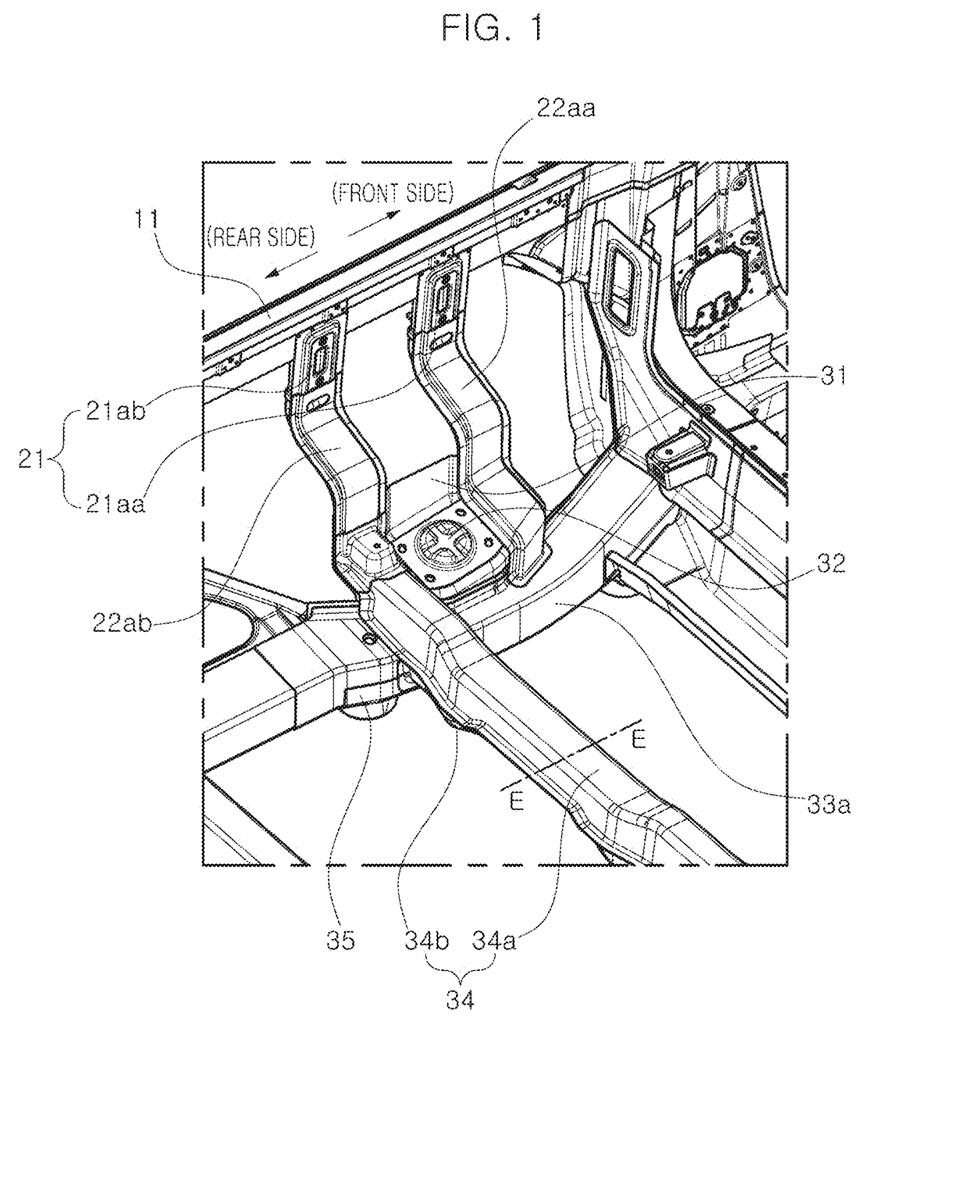
FIG. 1 is a perspective view illustrating a main part of a vehicle using a load distribution structure for a shock absorber of a vehicle according to embodiments of the present disclosure.

The shock absorber member upper 21 is disposed as a plurality of shock absorber member uppers at intervals in the longitudinal direction of the vehicle. FIG. 1 shows a configuration in which two shock absorber members uppers 21 are disposed.

Thus, the shock absorber member upper inner 21a includes a shock absorber member upper inner front 21aa positioned on the front side in the longitudinal direction of the vehicle and a shock absorber member upper inner rear 21ab positioned behind the shock absorber member upper inner front 21aa.

Similarly, the shock absorber member upper outer 21b includes a shock absorber member upper outer front 21ba positioned on the front side in the longitudinal direction of the vehicle and a shock absorber member upper outer rear 21bb positioned behind the shock absorber member upper outer front 21ba.

The shock absorber member upper outer front 21ba is fastened to the shock absorber member upper inner front 21aa by welding, and the shock absorber member upper outer rear 21bb is fastened to the shock absorber member upper inner rear 21ab by welding.

A through-hole is formed in each of the shock absorber member upper outer front 21ba, the shock absorber member upper inner front 21aa, the shock absorber member upper outer rear 21bb, and the shock absorber member upper inner rear 21ab so that a tool such as a welding gun can pass through during the welding.

An upper end of the shock absorber member mid 22 is connected to the lower end of the above shock absorber member upper 21, and a lower end thereof is connected to the rear side member 33.

The shock absorber member mid 22 is formed such that a shock absorber member mid inner 22a and a shock absorber member mid outer 22b are disposed on the inner and outer sides in the direction of the vehicle, respectively, and the shock absorber member mid inner 22a and the shock absorber member mid outer 22b are fastened to each other.

The shock absorber member mid inner 22a is formed in the height direction of the vehicle and is fastened to a lower portion of the shock absorber member upper inner 21a. The shock absorber member mid inner 22a is fastened to a lower end of the shock absorber member upper inner 21a.

The shock absorber member mid outer 22b is disposed on the outer side of the vehicle relative to the shock absorber member mid inner 22a and is fastened to the shock absorber member mid inner 22a. In addition, the shock absorber member mid outer 22b is fastened to a lower portion of the shock absorber member upper outer 21b.

The shock absorber member mid inner 22a and the shock absorber member mid outer 22b are fastened by welding. In addition, a fastening between the shock absorber member mid inner 22a and the shock absorber member upper inner 21a and a fastening between the shock absorber member mid outer 22b and the shock absorber member upper outer 21b are also performed by welding. In this case, the upper portion of the shock absorber member mid inner 22a is positioned inside the vehicle relative to the lower portion of the shock absorber member upper inner 21a.

Figure 3:
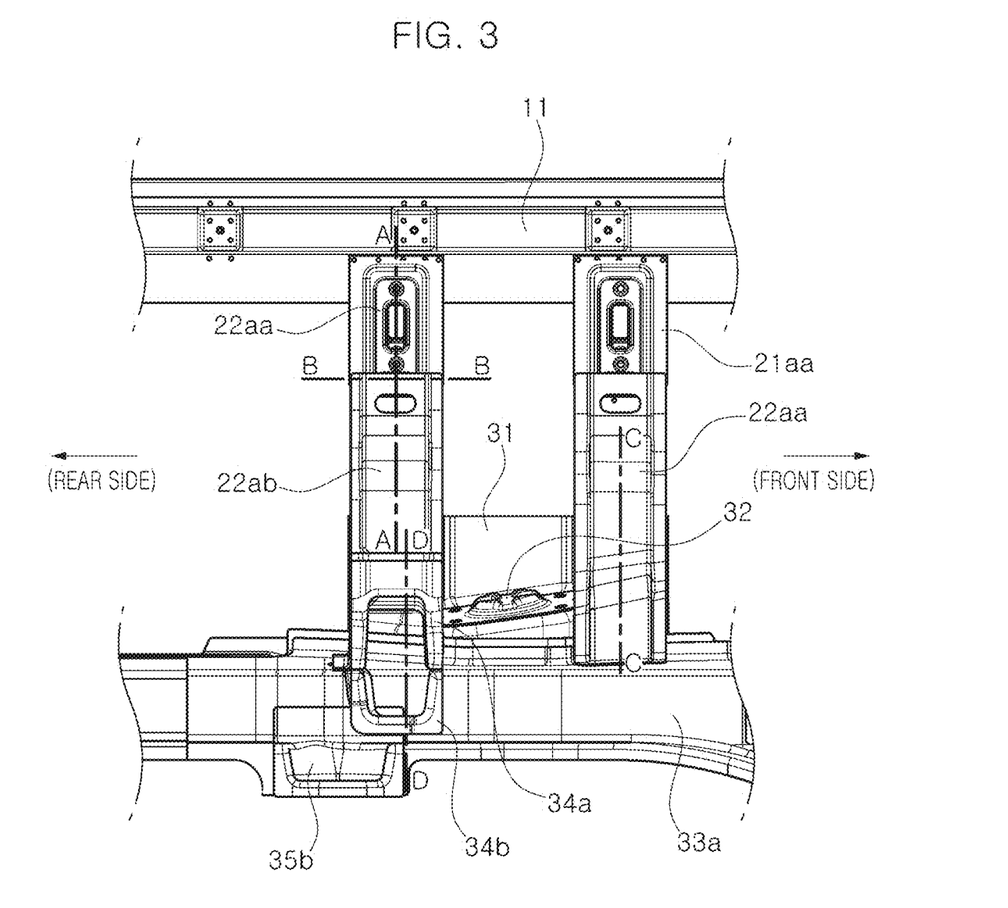
FIG. 3 is a front view illustrating the main part of the vehicle using the load distribution structure for a shock absorber of a vehicle according to embodiments of the present disclosure.
Figure 4:
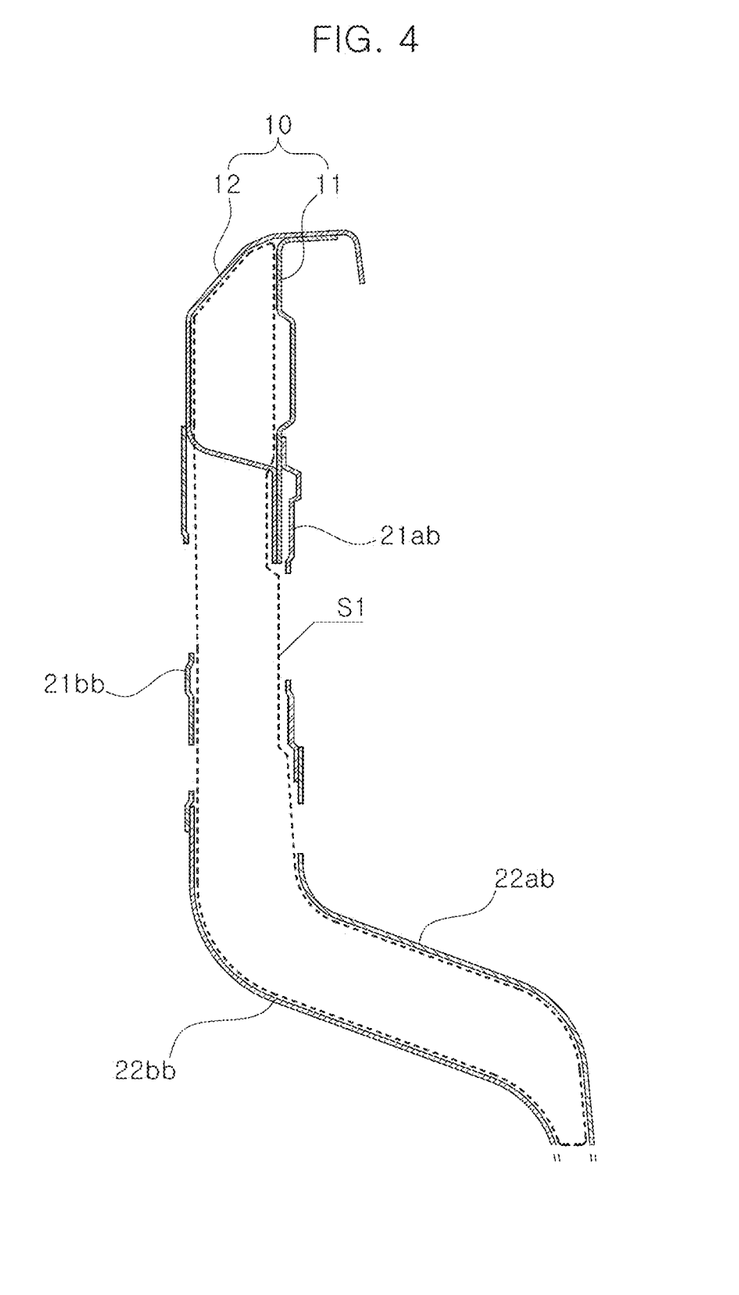
FIG. 4 is a cross-sectional view along line A-A of FIG. 3.

In a state in which the quarter upper member 10, the shock absorber member upper 21, and the shock absorber member mid 22 are fastened, a cross section perpendicular to the ground is formed such that an imaginary closed cross section S1 is formed inside the quarter upper member 10, the shock absorber member upper 21, and the shock absorber member mid 22. That is, the imaginary closed cross section S1, which connects inner surfaces of the shock absorber member upper inner 21a, the shock absorber member upper outer 21b, the shock absorber member mid inner 22a, the shock absorber member mid outer 22b, and the quarter upper member 10 in the height direction of the vehicle, is formed. A rigid structure can be obtained due to the closed cross section S1, and the closed cross section S1 can also be used as a part of a load path. FIG. 4 shows an example in which the closed cross section S1 is formed by the quarter upper inner 11, the quarter upper outer 12, the shock absorber member upper inner rear 21ab, the shock absorber member upper outer rear 21bb, the shock absorber member mid inner rear 22ab, and the shock absorber member mid outer rear 22bb along line A-A of FIG. 3. In the front side, the closed cross section S1 is also formed by the quarter upper inner 11, the quarter upper outer 12, the shock absorber member upper inner front 21aa, the shock absorber member upper outer front 21ba, the shock absorber member mid inner front 22aa, and the shock absorber member mid outer front 22ba.

In addition, an imaginary closed cross section S3, which connects inner surfaces of the shock absorber member mid inner 22a, the rear side member 33, the shock absorber member lower outer 23a, and the shock absorber member mid outer 22b, is formed. The closed cross section S3 serves as a single structure and is used as a part of the load path.

Figure 6:
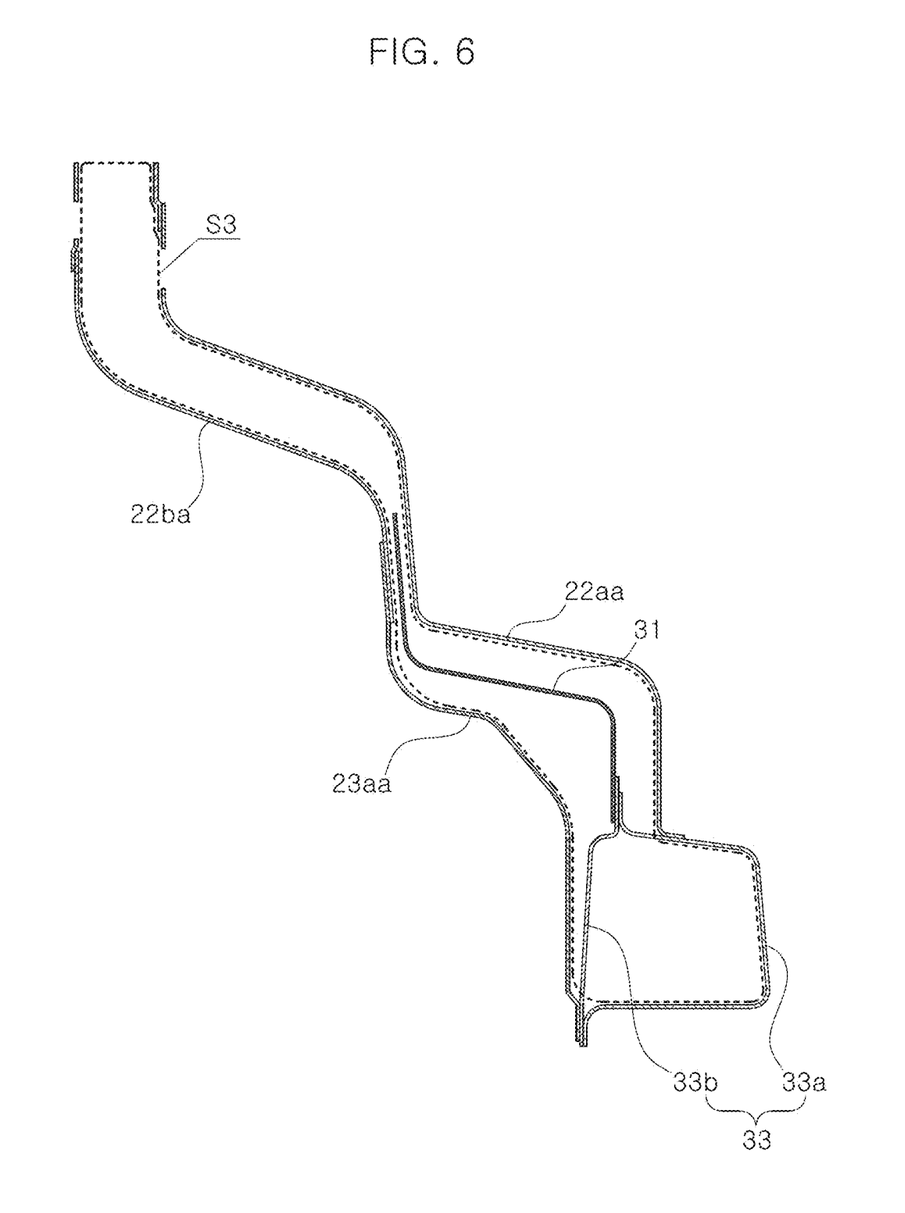
FIG. 6 is a cross-sectional view along line C-C of FIG. 3.

In particular, the closed cross section S3 is formed in a portion where the shock absorber member mid inner front 22aa is fastened to the rear side member inner 33a, i.e., at a front side of the shock absorber mounting panel 31 where the cross member 34 is not formed. As shown in FIG. 6, the closed cross section S3 is formed by the shock absorber member mid inner front 22aa, the shock absorber member mid outer front 22ba, the shock absorber member lower outer front 23aa, the rear side member inner 33a, and the rear side member outer 33b.

The shock absorber member mid inner 22a includes a shock absorber member mid inner front 22aa positioned on the front side in the longitudinal direction of the vehicle and a shock absorber member mid inner rear 22ab positioned behind the shock absorber member mid inner front 22aa.

In addition, the shock absorber member mid outer 22b includes a shock absorber member mid outer front 22ba positioned on the front side in the longitudinal direction of the vehicle and a shock absorber member mid outer rear 22bb positioned behind the shock absorber member mid outer front 22ba.

The shock absorber member mid outer front 22ba is fastened to the shock absorber member mid inner front 22aa by welding, and the shock absorber member mid outer rear 22bb is fastened to the shock absorber member mid inner rear 22ab by welding.

The shock absorber member mid inner front 22aa is fastened to the rear side member 33, i.e., a rear side member inner 33a, whereas the shock absorber member mid inner rear 22ab is fastened to the cross member 34, i.e., a cross member upper 34a.

A through-hole may be formed in each of the shock absorber member mid inner front 22aa, the shock absorber member mid outer rear 22bb, and the shock absorber member mid inner rear 22ab to allow a tool to pass therethrough.

A shock absorber member lower outer 23a may be provided between the shock absorber member mid 22 and the rear side member 33.

An upper portion of the shock absorber member lower outer 23a is fastened to the lower portion of the shock absorber member mid 22, and a lower portion thereof is fastened to an outer side of the rear side member 33.

However, since the shock absorber member upper 21 and the shock absorber member mid 22 are provided in a front-rear direction in the longitudinal direction of the vehicle, the shock absorber member lower outer 23a is also provided as the shock absorber member lower outer front 23aa and the shock absorber member lower outer rear 23ab and is disposed in a front-rear direction in the longitudinal direction of the vehicle.

The cross member 34 is formed such that the cross member upper 34a and the cross member lower 34b are disposed top and bottom and fastened to each other.

A side end of the cross member upper 34a is fastened to the lower portion of the shock absorber member mid inner 22a.

The cross member lower 34b is disposed below the cross member upper 34a, and a side end of the cross member lower 34b is fastened to a bottom surface of the rear side member 33.

Figure 8:
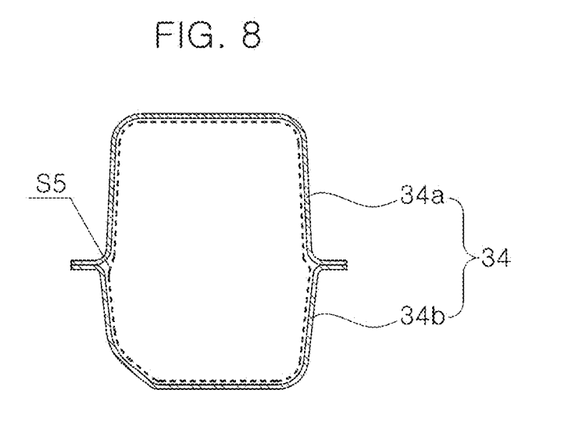
FIG. 8 is a cross-sectional view along line E-E of FIG. 1.

The cross member upper 34a and the cross member lower 34b are disposed top and bottom, and the front and rear ends of the cross member upper 34a and the cross member lower 34b are fastened to each other in the longitudinal direction of the vehicle so that the cross member 34 forms a closed cross section S5 as shown in FIG. 8. Thus, the cross member 34 becomes a single structure.

Figure 7:
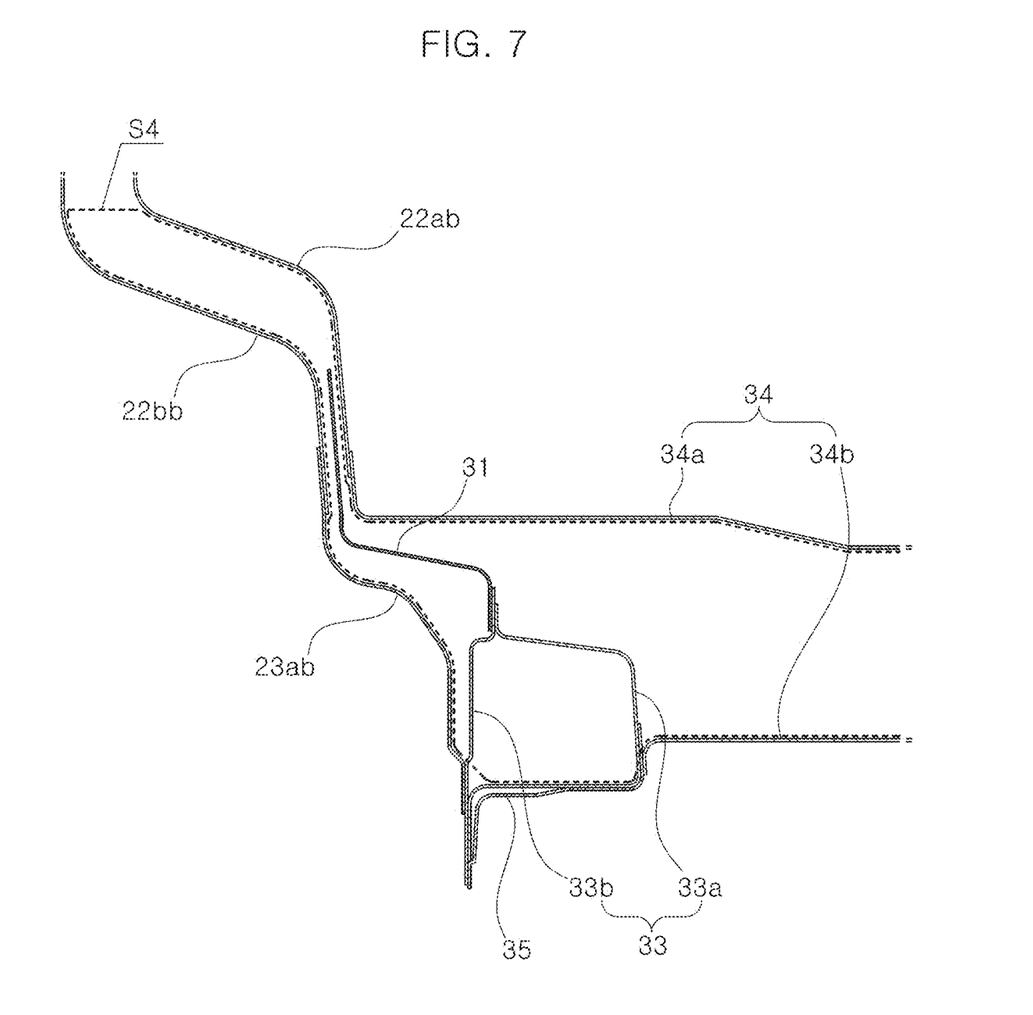
FIG. 7 is a cross-sectional view along line D-D of FIG. 3.

In addition, an imaginary closed cross section S4, which connects inner surfaces of the shock absorber member mid inner 22a, the rear side member 33, the shock absorber member lower outer 23a, and the shock absorber member mid outer 22b, is formed to become a single structure. The closed cross section S4 is formed in a portion where the shock absorber member mid inner rear 22ab is fastened to the cross member upper 34a, i.e., at a rear side of the shock absorber mounting panel 31 where the cross member 34 is formed. That is, as shown in FIG. 7, the closed cross section S4 is formed by the shock absorber member mid inner rear 22ab, the shock absorber member mid outer rear 22bb, the shock absorber member lower outer rear 23ab, the cross member upper 34a, the cross member lower 34b, the rear side member inner 33a, and the rear side member outer 33b.

A rear side frame bracket 35, which supports a bottom surface of the cross member lower 34b, is fastened to a bottom surface of the side end of the cross member lower 34b.

Figure 9:
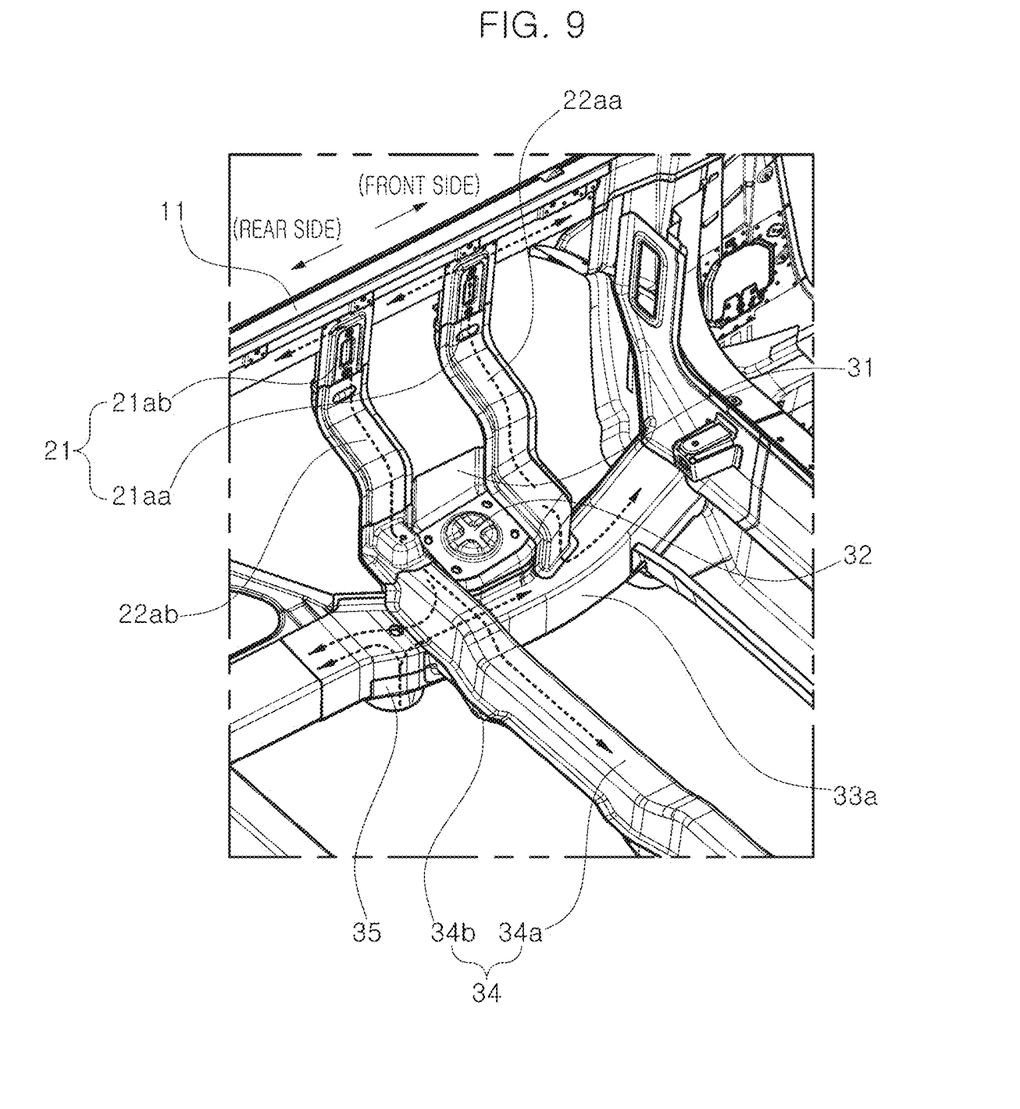
FIG. 9 is a schematic diagram illustrating a state in which a load is transmitted by the load distribution structure for a shock absorber of a vehicle according to embodiments of the present disclosure.

FIG. 9 shows a load path through which a load input to the shock absorber 40 is transmitted to the quarter upper member 10 according to the load distribution structure for a shock absorber of a vehicle according to embodiments of the present disclosure.

The load input to the shock absorber 40 is transmitted to the shock absorber mounting panel 31.

Some load is transferred from the shock absorber mounting panel 31 to the quarter upper member 10, and the remaining load is transferred to the rear side member 33 and the cross member 34.

The some load is transmitted from the shock absorber mounting panel 31 to the quarter upper member 10 through the shock absorber member mid 22 and the shock absorber member upper 21 and is distributed and transferred in the quarter upper member 10 in the longitudinal direction of the vehicle.

The load transferred to the rear side member 33 is distributed and transferred through the rear side member 33 in a front-rear direction of the vehicle, and the load transferred to the cross member 34 is distributed and transferred through the cross member 34 in the width direction of the vehicle.

In addition, some load is input through the rear side frame bracket 35 and is distributed and transmitted through the rear side member 33 in the front-rear direction of the vehicle.

In this way, the load input through the shock absorber 40 is distributed from the shock absorber mounting panel 31 and the rear side frame bracket 35 and transmitted to the vehicle body.

Vehicles such as pickup trucks often travel on off-roads, and when traveling on the off-roads, a large load is input through the shock absorber 40. As described above, since the load is distributed and transmitted, frame rigidity can be strengthened and durability can be improved.

According to the load distribution structure for a shock absorber of a vehicle of embodiments of the present disclosure with the above configuration, since a structure of a closed cross section is formed by connecting components from a rear floor on which a rear shock absorber is mounted to a quarter member positioned above the rear floor in a vehicle such as a pickup truck, a load input from the rear shock absorber can be uniformly distributed. Therefore, frame rigidity and durability of the vehicle can be improved.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A load distribution structure for a shock absorber of a vehicle, the load distribution structure comprising:
   a shock absorber mounting panel fastened to an upper end of the shock absorber of the vehicle;
   a quarter upper member disposed in a longitudinal direction of the vehicle;
   a rear side member disposed in the longitudinal direction of the vehicle and configured to support a lower end of the shock absorber mounting panel;
   a shock absorber member mid comprising a lower end connected to the rear side member; and
   a shock absorber member upper comprising a lower end connected to the shock absorber member mid and an upper end connected to the quarter upper member, wherein a closed cross section is defined in the rear side member, the shock absorber member mid, and the shock absorber member upper, which are connected to each other,
   wherein the shock absorber member upper comprises:
      a shock absorber member upper inner disposed in a height direction of the vehicle and fastened to a lower portion of the quarter upper member; and
      a shock absorber member upper outer disposed on an outer side of the vehicle relative to the shock absorber member upper inner, fastened to the shock absorber member upper inner, and fastened to a lower portion of the quarter upper member on the outer side of the vehicle below the quarter upper member relative to the shock absorber member upper inner.

2. The load distribution structure of claim 1, further comprising a shock absorber mounting reinforcement configured to reinforce rigidity of the shock absorber mounting panel on an upper surface of the shock absorber mounting panel.

3. The load distribution structure of claim 2, wherein:
   the shock absorber mounting reinforcement and the shock absorber are disposed on upper and lower surfaces of the shock absorber mounting panel, respectively; and
   the shock absorber mounting reinforcement is disposed such that the shock absorber mounting panel and the shock absorber are integrally fastened.

4. The load distribution structure of claim 1, wherein the quarter upper member comprises:
   a quarter upper inner; and
   a quarter upper outer disposed on an outer side of the vehicle relative to the quarter upper inner and comprising upper and lower ends fastened to upper and lower ends of the quarter upper inner, respectively.

5. The load distribution structure of claim 1, wherein a closed cross section is defined to surround inner surfaces of the shock absorber member upper inner and the shock absorber member upper outer in a direction parallel to a ground surface.

6. The load distribution structure of claim 1, wherein the shock absorber member mid comprises:
   a shock absorber member mid inner disposed in the height direction of the vehicle and fastened to a lower portion of the shock absorber member upper inner; and
   a shock absorber member mid outer disposed on the outer side of the vehicle relative to the shock absorber member mid inner and fastened to a lower portion of the shock absorber member upper outer.

7. The load distribution structure of claim 6, wherein the shock absorber member upper inner, the shock absorber member upper outer, the shock absorber member mid inner, and the shock absorber member mid outer are disposed with an interval from each other in a front-rear direction in the longitudinal direction of the vehicle.

8. The load distribution structure of claim 6, wherein an upper portion of the shock absorber member mid inner is positioned on an inner side of the vehicle relative to a lower portion of the shock absorber member upper inner.

9. The load distribution structure of claim 6, wherein a closed cross section is defined to connect inner surfaces of the shock absorber member upper inner, the shock absorber member upper outer, the shock absorber member mid inner, the shock absorber member mid outer, and the quarter upper member in the height direction of the vehicle.

10. The load distribution structure of claim 6, further comprising a shock absorber member lower outer comprising an upper portion fastened to the lower portion of the shock absorber member mid and a lower portion fastened to an outer portion of the rear side member.

11. The load distribution structure of claim 10, wherein a closed cross section is defined to connect inner surfaces of the shock absorber member mid inner, the rear side member, the shock absorber member lower outer, and the shock absorber member mid outer.

12. The load distribution structure of claim 10, wherein a lower portion of the shock absorber member mid inner is connected to a cross member disposed in a lateral direction of the vehicle.

13. The load distribution structure of claim 12, wherein the cross member comprises:
   a cross member upper comprising a side end fastened to the lower portion of the shock absorber member mid inner; and
   a cross member lower disposed below the cross member upper and comprising a side end fastened to a bottom surface of the rear side member.

14. A vehicle comprising:
   a vehicle body;
   a wheel coupled to the vehicle body;
   a shock absorber installed on the vehicle body;
   a shock absorber mounting panel fastened to an upper end of the shock absorber;
   a quarter upper member disposed in a longitudinal direction of the vehicle;
   a rear side member disposed in the longitudinal direction of the vehicle and configured to support a lower end of the shock absorber mounting panel;
   a shock absorber member mid comprising a lower end connected to the rear side member; and
   a shock absorber member upper comprising a lower end connected to the shock absorber member mid and an upper end connected to the quarter upper member, wherein a closed cross section is defined in the rear side member, the shock absorber member mid, and the shock absorber member upper, which are connected to each other,
   wherein the shock absorber member upper comprises:
      a shock absorber member upper inner disposed in a height direction of the vehicle and fastened to a lower portion of the quarter upper member; and
      a shock absorber member upper outer disposed on the outer side of the vehicle relative to the shock absorber member upper inner, fastened to the shock absorber member upper inner, and fastened to a lower portion of the quarter upper member on the outer side of the vehicle below the quarter upper member relative to the shock absorber member upper inner.

15. The vehicle of claim 14, further comprising a shock absorber mounting reinforcement configured to reinforce rigidity of the shock absorber mounting panel on an upper surface of the shock absorber mounting panel.

16. The vehicle of claim 15, wherein:
    the shock absorber mounting reinforcement and the shock absorber are disposed on upper and lower surfaces of the shock absorber mounting panel, respectively; and
    the shock absorber mounting reinforcement is disposed such that the shock absorber mounting panel and the shock absorber are integrally fastened.

17. The vehicle of claim 14, wherein:
    the quarter upper member comprises:
        a quarter upper inner; and
        a quarter upper outer disposed on an outer side of the vehicle relative to the quarter upper inner and comprising upper and lower ends fastened to upper and lower ends of the quarter upper inner, respectively.

18. The vehicle of claim 14, wherein a closed cross section is defined to surround inner surfaces of the shock absorber member upper inner and the shock absorber member upper outer in a direction parallel to a ground surface.

19. The vehicle of claim 14, wherein the shock absorber member mid comprises:
    a shock absorber member mid inner disposed in the height direction of the vehicle and fastened to a lower portion of the shock absorber member upper inner; and
    a shock absorber member mid outer disposed on the outer side of the vehicle relative to the shock absorber member mid inner and fastened to a lower portion of the shock absorber member upper outer.

* * * * *